United States Patent [19]

Charas et al.

[11] Patent Number: 4,467,326
[45] Date of Patent: Aug. 21, 1984

[54] METHOD AND APPARATUS FOR PREVENTING THE RESPONSE OF A RADAR BEACON TO RECEIVE RADAR PULSES ORIGINATING FROM THE SIDE LOBES OF A TRANSMITTER AND AN ARRANGEMENT

[75] Inventors: Philip M. Charas, Mölndal; Per-Olof G. Gustavsson, Pixbo; Bo A. Morwing, Åsa Station, all of Sweden

[73] Assignee: Telefonaktiebolaget L M Ericsson, Stockholm, Sweden

[21] Appl. No.: 284,184

[22] PCT Filed: Dec. 8, 1980

[86] PCT No.: PCT/SE80/00325
§ 371 Date: Jul. 17, 1981
§ 102(e) Date: Jul. 17, 1981

[87] PCT Pub. No.: WO81/01747
PCT Pub. Date: Jun. 25, 1981

[30] Foreign Application Priority Data

Dec. 11, 1979 [SE] Sweden ............................... 7910168

[51] Int. Cl.³ ............................................. G01S 9/56
[52] U.S. Cl. .................................... 343/6.5 R; 343/379
[58] Field of Search ............... 343/6.5 R, 6.5 LC, 379

[56] References Cited

U.S. PATENT DOCUMENTS 2,824,301  2/1958  Levell et al. ..................... 343/6.5 R
3,007,156  10/1961 Barber ............................ 343/6.5 LC
3,934,251  1/1976  Spratt ............................. 343/6.5 R Primary Examiner—Maynard R. Wilbur
Assistant Examiner—M. R. Gordon
Attorney, Agent, or Firm—Roberts, Spiecens & Cohen

[57] ABSTRACT

A method for preventing a radar beacon's response to received pulses from a vessel which originate from the side lobes of the vessel antenna. The carrier frequency of the radar signal pulses to and received by the beacon is measured and a value of this frequency is stored when the amplitudes of the signal pulses exceed a certain high threshold level (Th). If signals after that are received which exceed a low threshold level (Tl) (but not the high) the carrier frequency of such signals is measured and a corresponding value is stored. Measuring two subsequent and equal carrier frequencies is considered as a criterion that a response signal from the beacon responding to the second received signal should not be transmitted. An arrangement to carry out the method is described.

6 Claims, 7 Drawing Figures

METHOD AND APPARATUS FOR PREVENTING THE RESPONSE OF A RADAR BEACON TO RECEIVE RADAR PULSES ORIGINATING FROM THE SIDE LOBES OF A TRANSMITTER AND AN ARRANGEMENT

TECHNICAL FIELD

The present invention relates to a method and an arrangement in the receiver of a radar beacon which is intended to respond to radar pulses from vessels within a certain radial distance from the beacon. The carrier frequency of the transmitted radar pulses from a certain vessel differ from the carrier frequency of the radar pulses from another vessel. The radar beacon then transmits as a response to the received radar pulses a signal which consists of one or several pulses with the same carrier frequency as those received and with a certain duration back to the transmitting vessel, for indicating information about the position of the beacon.

BACKGROUND ART

Radar beacons of the so called sweep frequency type are heretofore known which provide responding signals to a vessel whereas the frequency of the sweeping responding signal coincides with the frequency of the signal transmitted from the vessel. Such a technique has a certain delay of the responding signal of the magnitude 1-2 minutes which, however, is not considered to be fully satisfying by, among others, the shipping authorities. Another disadvantage of previously known radar beacons is that they under certain circumstances they also respond to signals originating from the side lobes of the vessel antenna. This implies ambiguity concerning the position of the beacon when this position is indicated on the indicator of the vessel. The useful range of the radar beacon will then be limited to the position of such vessels which are situated outside a critical area within which radar pulses originating from the side lobes are also so strong that the radar beacon respond.

DISCLOSURE OF THE INVENTION

The principles of the method and the arrangement or apparatus of the present invention are based on the observation that the probability that two (or more) vessels transmit radar pulses with the same carrier frequency is small. By detecting and storing the frequency of the received pulses in the receiver of the radar beacon and, after that, comparing the frequencies and the signal strength, it can be determined whether or not a transmitted pulse originates from a side lobe of the antenna system of the vessel radar, and thus whether or not a responding signal should be transmitted back. The arrangement also makes it possible for the radar beacon to give a response to a transmitted radar pulse from a certain vessel a short time after that the carrier frequency of the received radar pulse is detected by the receiver. The response then consists of a signal with the same frequency as the radar pulse transmitted from the vessel.

An object of the present invention is thus to provide a method and apparatus included in the receiver of a radar beacon which receives radar pulses transmitted from a vessel with a certain carrier frequency and which prevents that beacon's response to radar pulses which originate from the side lobes of the antenna system of the vessel, but transmits responding signals only for the radar pulses which originate from the main lobe of the antenna system.

BRIEF DESCRIPTION OF THE DRAWINGS

The invention will now be more fully described with reference to the accompanying drawing in which FIG. 1 schematically shows the position of three vessels in relation to a radar beacon whose receiver contains the arrangement according to the present invention.

DESCRIPTION OF PREFERRED EMBODIMENTS OF THE INVENTION

Figure 1:
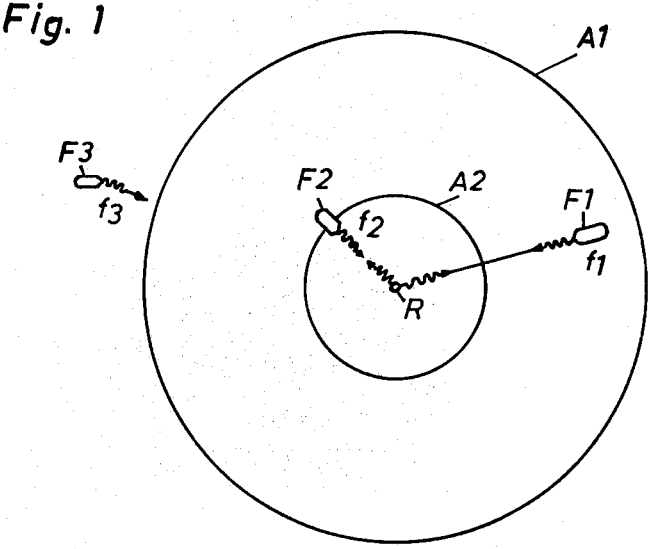

In FIG. 1, the positions of three vessels F1, F2, F3 are schematically shown in relation to a radar beacon R. Each vessel transmits signals in the form of radar pulses with a certain carrier frequency within, for example, the S-band (2.9-3.1 GHz) designated f1, f2 and f3, respectively, which frequencies are assumed to be mutually different. The radar pulses from a vessel are intended to be captured by the receiver in the radar beacon R which will transmit a responding signal back to the vessel which consequently obtains information about the position of the beacon R. The range of the transmitted radar pulses and the responding signals is, however, limited so that the vessel F3 which is situated outside the area whose limit is designated reference A1 cannot expect any response from the beacon when pulses are transmitted. The vessel F1 which is situated within the area limited by the limits A1 and A2 obtains a responding signal from the beacon R only for the pulses transmitted (and received) by the main lobe of the vessel antenna. For the vessel F2, situated just within the area defined by the limit A2 it is possible that also pulses transmitted by the side lobes will be detected by the receiver of the beacon, for which reason responding signals are also transmitted on these pulses.

Figure 2:
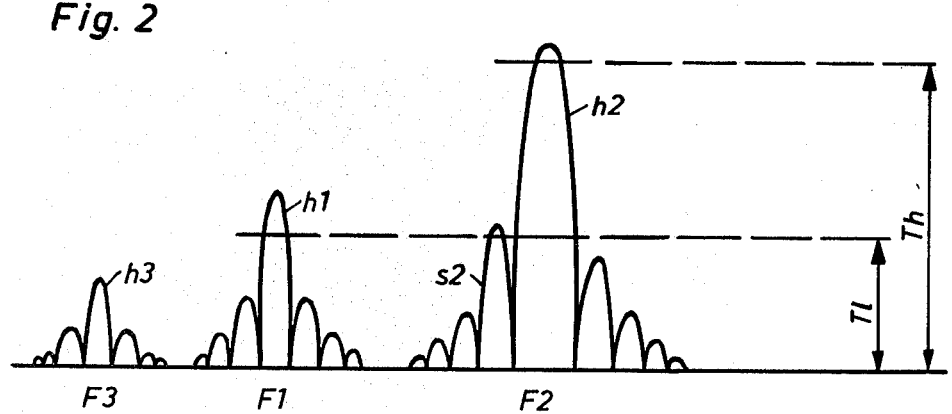
FIG. 2 shows a schematic diagram of the time variation of the received signal strength for the vessels shown in FIG. 1.

In FIG. 2, the signal strength received in the beacon R from the transmitters of the vessels F1-F3 according to FIG. 1 is schematically shown. The transmitters are assumed to have an antenna pattern with a dominating main lobe and a number of side lobes around the main lobe. The strength of the transmitted signals from the vessels F1-F3 is assumed to be substantially equal. According to the proposed method, two threshold levels Tl and Th are selected to detect and to receive the signals from the vessels F1-F3 in the beacon R. The lower threshold level Tl is selected so that the signals from the main lobe h1 exceed the threshold Tl, i.e. with respect to the lowest level which should be detected within a range determined by the limit A1. The signals from the main lobe h3 (vessel F3) are then too weak to exceed the threshold Tl. The range limit A2 corresponds to the distance when the signal strength of the side lobe s2 exceeds the lower threshold level Tl. The higher threshold level Th is after that established so that the signal strength of the signals from the main lobe h2 exceeds the level Th when the magnitude of the side lobe s2 exceeds the level Tl.

When the radar antenna of the vessel rotates, the main lobe h2 will at a certain instant point towards the beacon R. The transmitted radar pulses are captured by the beacon R and its receiver detects the carrier frequency f2 of the pulses from the transmitter of the vessel F2. If these received and detected pulses exceed the lower threshold level Tl, the beacon responds by transmitting a signal with the same frequency f2. Somewhat later the antenna of the vessel has rotated so that the side lobe s2 points towards the beacon R. Under the assumption that the signal received by the beacon at this instant exceeds the threshold Tl, the carrier frequency will be detected by the receiver and a new responding signal (with the frequency f2) will be transmitted if no measures in the receiver are taken. Thus, from the beacon to the vessel F2 responding signals are transmitted on two occasions. These two signals give on the PPI of the vessel two positions (two "marks") which indicate the position of the beacon. This will give an undesired ambiguity of the detected position of the beacon. According to the proposed method, the carrier frequency of the received signal pulses is measured and a value of this frequency is stored for the signal which exceeds the higher threshold level Th, i.e. the carrier frequency of the signal pulses from the main lobe h2 is stored. After detection of the signal pulses from a side lobe s2, the carrier frequency is measured which is the same as for the signal pulses of the main lobe. The fact that two equal carrier frequencies have been measured immediately after one another is used as a criterion that a signal responding to the other received signal should not be transmitted whereby the above mentioned ambiguity can be avoided.

Figure 3:
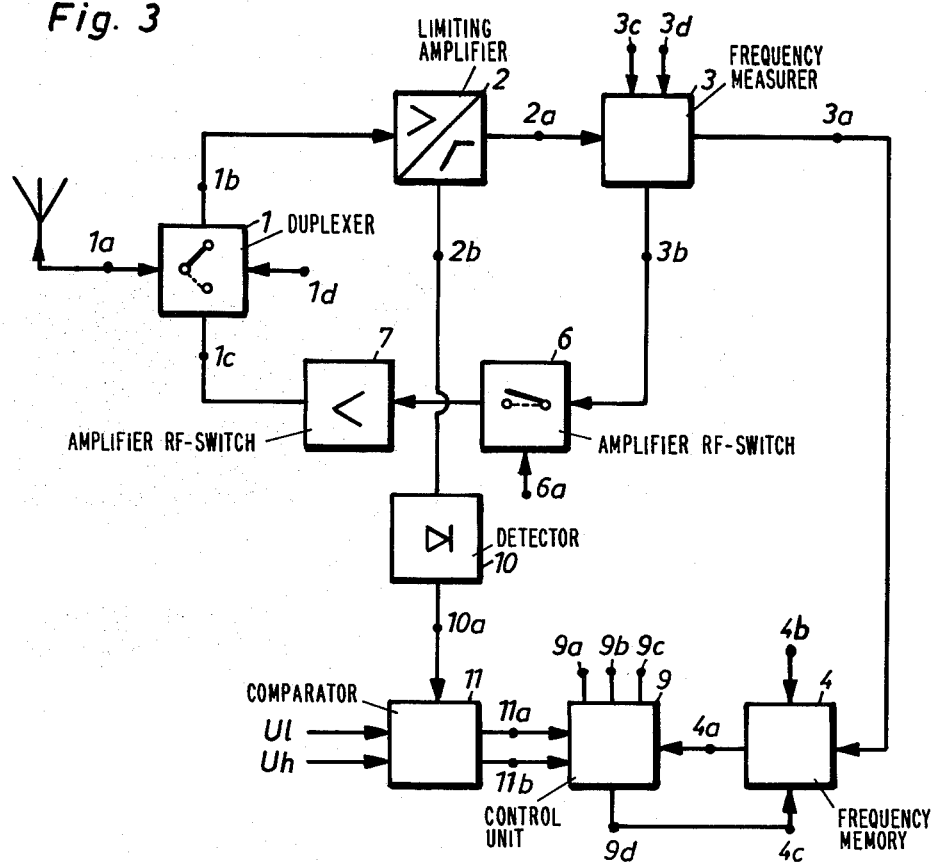
FIG. 3 shows a block diagram of the part of the radar beacon receiver in which the arrangement according to the invention is included.

In the block diagram according to FIG. 3, the part of the radar beacon receiver is shown which contains the arrangement according to the invention. The duplexer of the receiver is designated 1 and is controlled via an input 1d in dependence on control pulses from the output 9b of a control unit 9 to two positions, on the one hand to receive an incoming signal via the connections 1a–1b, and on the other hand for transmitting a responding signal via the connections 1c–1a. This will be more fully described below. To the output of the duplexer 1a limiting amplifier 2 is connected which amplifies and limits the received signal so that a signal having a well defined amplitude appear across its output 2a. The amplifier has a further output 2b across which the received signal before limiting appears. The output 2b is connected to a detector 10 which, after detection of the signal from the amplifier 2 delivers a signal (U) whose level corresponds to the strength (level) of the received signal. The output of the detector is connected to a comparator 11 in which the incoming signal level is compared with two threshold levels Ul and Uh corresponding to the threshold Tl and a second higher threshold Th.

Figure 4:
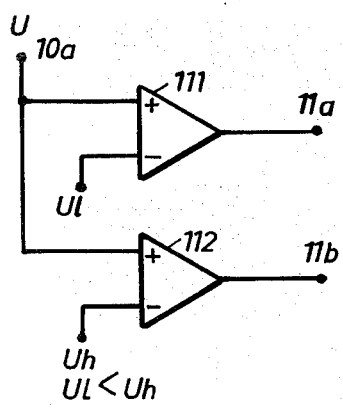
FIG. 4 shows a block diagram of a comparator included in the arrangement.
Figure 5:
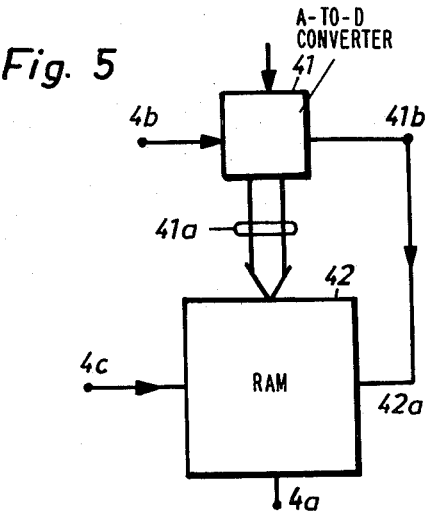
FIG. 5 shows a block diagram of the frequency memory included in the arrangement.

According to FIG. 4, the comparator 11 can as previously known consist of two differential amplifiers 111, 112 which receives at their plus inputs a signal level from the detector 10 and whose minus inputs are connected the two reference voltages Ul and Uh, respectively, as shown in FIG. 4. If the level $U>Ul$, a logic "one" is obtained across the output 11a. If $U>Uh$ (and then also $U>Ul$), a "one" is obtained across the output 11b. To the control unit 9 thus logic conditions are delivered via the outputs 11a, 11b in dependence on the level of the incoming and received signal.

The output 2a of the amplifier 2 is connected to a frequency measuring unit 3. From this unit an analog signal in the form of a DC-voltage is obtained across the output 3a, which constitutes a measure of the frequency of the received signal. Across the output 3b a continuous AC-voltage appears having the same frequency as the frequency of the received pulse. The frequency measuring unit 3 can be designed as described in, for example, the Swedish patent application 7909984-2.

The output 3a of the frequency measuring unit 3 is connected to a frequency memory 4. This consists according to FIG. 4 of an analog-digital converter 41 whose input is connected to the output 3a of the frequency measuring unit 3. The converter 41 is, for example, an 8-bits analog/digital converter. The eight outputs 41a are connected to the address inputs of a static RAM-memory 42 (for example "Monolitic Memories" type 6531) with 256 different memory cells in which each a "one" or a "zero" is stored. The memory 42 thus has 256 different addresses corresponding to the 256 different memory cells which can be adressed by means of an 8-bits digital word from the output of the analog/digital converter. A certain address in the RAM-memory 42 thus corresponds to a certain frequency value measured by the frequency measuring unit 3. A "one" in a certain memory cell thus indicates that this frequency has been measured.

Across the input 4b of the frequency memory a signal is obtained from the output 9b of the control unit 9 which indicates when the AD-conversion should be initiated. From the AD-converter, across the output 41b which is connected to the input 42a of the memory, a pulse is obtained when the conversion is terminated. During this pulse, the memory cell corresponding to the address transferred to the memory is connected to the output 4a and, during the pulse duration, also the contents of the memory cell can be changed by a writing pulse obtained from the output 9d of a control unit via the input 4c of the frequency memory. The output 4a of the memory is connected to the control unit 9.

The control unit 9 receives signals on the one hand from the two outputs 11a, 11b of the comparator 11, on the other hand from the output 4a of the frequency memory. The signals are:

(a) A logic signal from the output 11a in the case that an incoming signal exceeds the threshold value Ul, (b) A logic signal from the output 11b in the case that the magnitude of a received signal exceeds the threshold value Uh determined in the comparator 11 and (c) A logic signal from the frequency memory 4 across the output 4a which indicates if a certain frequency is stored in the memory or not.

Across the output 9a of the control unit which is connected to the control input 3c of the block 3, a pulse is obtained for activating the frequency measuring as described in the above mentioned Swedish patent application, the received carrier frequency being measured. The pulse across the output 9a is obtained when the threshold Tl is exceeded.

After a determined time Δ, the pulse across 9a ceases and, instead, across the output 9b a pulse is obtained. The output 9b is connected to the control input 3d of the block 3 where the pulse implies that the block 3 is controlled so that it delivers a continuous signal having an accurately stabilized frequency identical with the measured carrier frequency. The output 9b is, in addition, connected to the control input 4b of the AD-converter 41, the pulse across the output 9b causing the AD-converter 41 to start the conversion. Furthermore, the switch 1 changes from the receiving-to the transmitting position, i.e. a connection 1a–1c is obtained when a pulse across the output 9b and thus across the input 1d is obtained. The switch 6 is then in an open position.

The third output 9c of the control unit 9 is connected to the control input 6a of a controllable RF-switch 6. This is connected between the output 3b of the frequency measuring unit 3 and the input of a transmitting amplifier 7. When activating the switch by means of a control signal across the input 6a the amplifier 7 is connected to the output 3b. The condition to obtain a control signal across the output 9c is:

(a) The threshold Tl should have been exceeded, i.e. a "one" should be present across the output 11b of the comparator 11, or (b) The threshold Tl should have been exceeded, i.e. a "one" should be present across the comparator output 11a and a logic "zero" is obtained form the output 4a of the frequency memory.

Across the fourth output 9d the control unit delivers a writing pulse to the frequency memory 4. The writing pulse implies that a "one" is written into the memory cell which is determined by the address obtained from the AD-converter. A writing pulse is delivered from the control unit provided that the threshold Th has been exceeded. The written and stored "one" in the memory cell can remain during at least the time interval which corresponds to the distance between two subsequent incoming main lobes from the same vessel. The "one" can also remain in the memory cell for a longer time, in certain cases up to 1 minute. The stored "one" then blocks the storing of carrier frequency values from vessels whose transmitted main lobes, when received in the beacon, do not exceed the threshold Th (but exceed the threshold Tl).

The operation of the arrangement will now be more fully described by describing the events at three different vessel positions.

Figure 6A:
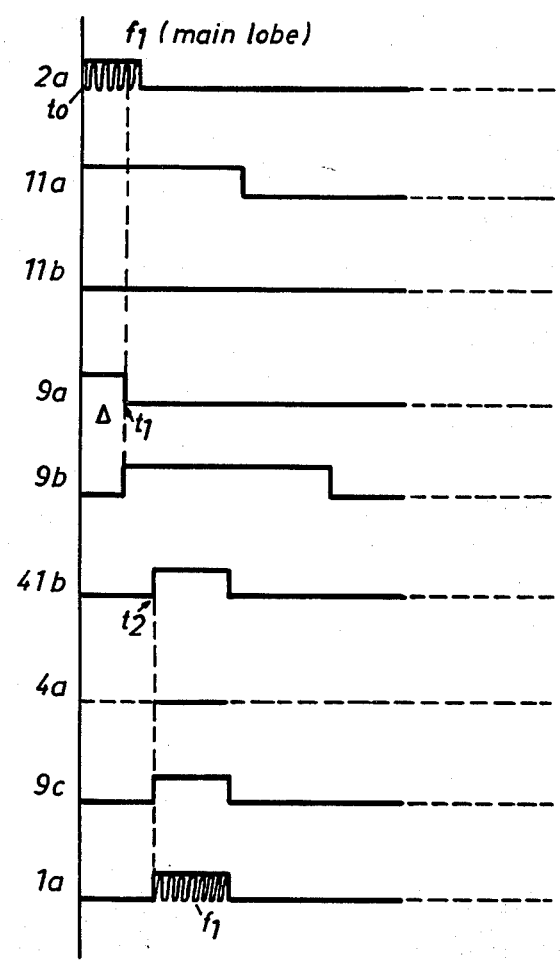
FIGS. 6a-6b show diagrams of certain waveforms which appear in the arrangement according to FIG. 3.

In the first case it is assumed that the vessel is situated outside the distance A1 (vessel F3 in FIG. 1). The signals from the vessel radar are at the radar beacon R too weak to be detected and any response from the beacon is not obtained. In the second case, the vessel is situated in the area distances A2 and A1 (vessel F1 in FIG. 1). The signals from the vessel are in this case so strong at the radar beacon that the signals which originate from the main lobe of the antenna exceed the threshold Th. The threshold Tl is, however, not exceeded and signals from the side lobes do not exceed the threshold Tl. The process is then the following (see FIG. 6a):

At the time t0, a pulse appears with the carrier frequency f1 (from F1) across the output 2a of the amplifier-limiter stage 2. The pulse is assumed to originate from a main lobe. The comparator 11 with then deliver a signal (a "one") across the output 11a but no signal across the output 11b. At the time t0, also an activating pulse is delivered across the output 9a of the control unit 9. The pulse across output 9a activates the frequency measuring in the block 3. The carrier frequency f1 is measured and a signal in the form of a DC-level corresponding to the measured value is delivered to the frequency memory 4. At the time t1=t0+Δ, where Δ is a certain determined delay, a pulse across the output 9b is delivered which, as described above, implies that the block 3 is controlled so that it across the output 3b delivers a continuous signal with an accurately stabilized frequency equal to the frequency f1.

The AD-converter will start the conversion and, at the time t2, a signal is delivered (via 41b) to the memory indicating that a conversion is terminated. Since, however, the threshold Th has not been exceeded, nothing is written into the memory. The output signal 4a from the memory at the time t3 thus is a "zero". By this, the condition b for the control signal across the output 9c of the control unit is fulfilled which implies that a control signal is delivered and that the switch 6 is closed. Since previously (by the signal across the output 9b), the switch 1 has switched a carrier wave pulse with the frequency f1 will be transmitted.

After a certain time the antenna of the vessel has turned so that signals from the side lobes reach the beacon. The signals are, as assumed above, too weak in order to exceed the threshold Tl. Thus any signal across the output 11a of the comparator is not obtained and any frequency measuring will not be performed. This implies that the side lobe signal will not be responded.

Figure 6B:
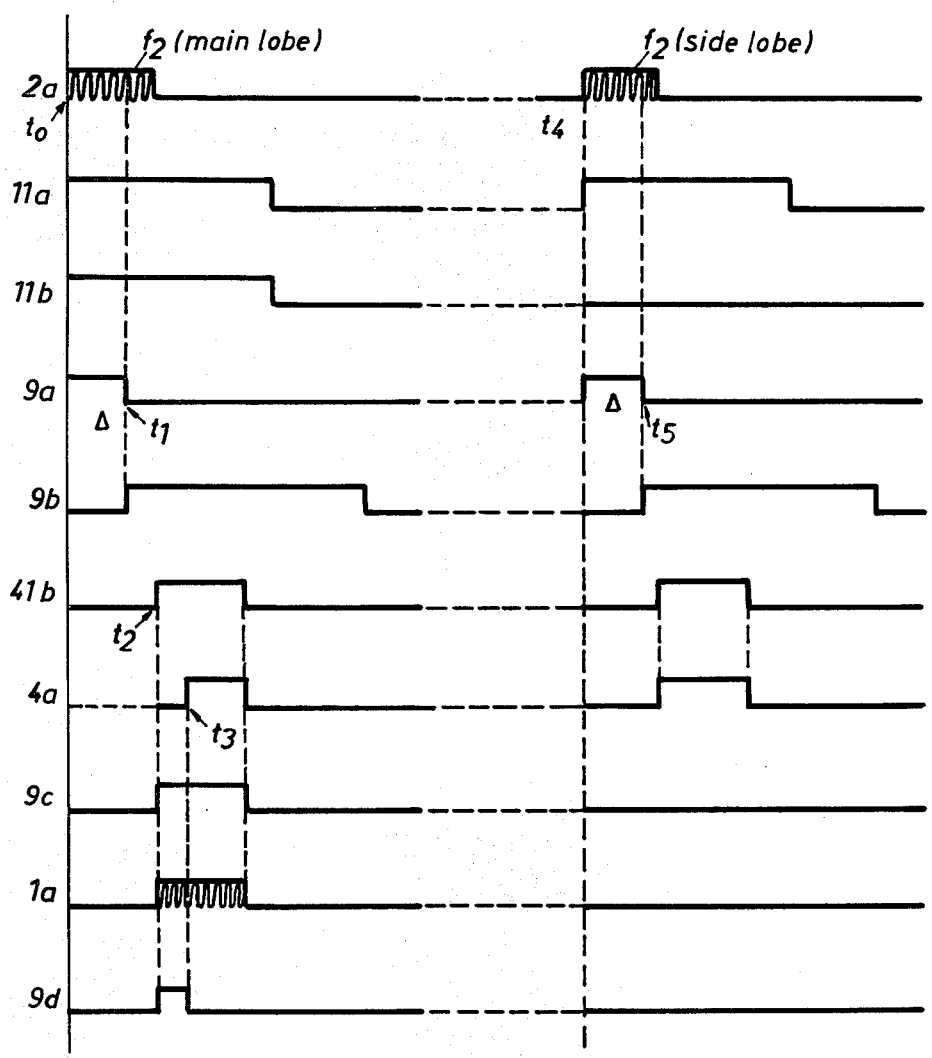

In the third case the vessel is situated within the distance A2 (vessel F2 in FIG. 1). A signal from the main lobe then exceeds the threshold Th and the signals from the side lobes the threshold Tl. The process will be the following (see FIG. 6b):

At the time t0, a pulse appears with the carrier frequency f2 across the output 2a of the amplifier-limiter stage 2. The pulse is assumed to originate from a main lobe. Due to the strength of the signal, the threshold Th is exceeded and then of course also the lower threshold Tl. Thereby the condition (a) for delivering the control signal across the output 9c is fulfilled and, after the frequency measuring and adjusting the frequency according to the above, a pulse will be transmitted with the carrier frequency f2. In addition to this the following happens:

Because the threshold Th is exceeded, the control unit will across its output 9d deliver a writing pulse to the frequency memory 4. The writing pulse is delivered during the pulse across the output 41b of the converter and implies that a "one", at the time t3, is written into the memory cell which is indicated by the address from the converter 41.

After a certain time (at the time t4) the beacon is reached by signals from the side lobes of the vessel antenna. These signals have sufficient strength to exceed the threshold Tl but not Th. This implies, analoguous to what has been described above, that the frequency measuring and-adjustment, and AD-conversion is performed. The side lobe signals have the same carrier frequency as the main lobe signals. The AD-converter will thereby address the same memory cell as before. In this, now a "one" is written and is available across the output 4a. The control unit then finds that the condition b for the control signal across the output 9c is not fulfilled and any control signal will not be transmitted and consequently no responding pulse.

By the described arrangement it is thus possible that after measuring the strength and the frequency of the received signals make such logic decisions that the radar beacon will not respond to signals which originate from the side lobes of the vessel antenna.

We claim:

1. A method of preventing the response of a radar beacon to radar pulses from one of a number of transmitters, each of said transmitters having an antenna which emits the radar pulses with a predetermined carrier frequency and a radiation pattern with a main lobe and several side lobes, said method comprising the steps of comparing the amplitude of a received radar pulse with upper and lower predetermined threshold values, the lower threshold value corresponding to the minimum peak value signal to which the radar beacon will respond, the upper value being chosen such that ratio between said upper and lower values is no greater than the ratio between the the peak values of the main lobe and the greatest side lobe of the antenna of a transmitter, measuring the carrier frequency of the received radar pulses and storing a representation of the carrier frequencies of those received radar pulses whose main lobes have a peak value greater than said uppper value, the storing being for a period of time at least equal to the time period between two successive radar pulses from the same transmitter, and controlling the radar beacon to respond to only those radar pulses whose lobe peak values either exceed said upper value or said lower value provided a representation of the associated carrier frequency has not been stored.

2. Apparatus for preventing the response of a radar beacon to radar pulses from one of a number of transmitters, each of said transmitters having an antenna which emits the radar pulses with a predetermined carrier frequency and a radiation pattern with a main lobe and several side lobes, said apparatus comprising comparing means for comparing the amptitude of a received radar pulse with upper and lower predetermined threshold values, the lower threshold value corresponding to the minimum peak value signal to which the radar beacon will respond, the upper value being chosen such that ratio between said upper and lower values is no greater than the ratio between the peak values of the main lobe and the greatest side lobe of the radiation pattern of an antenna of a transmitter, measuring means for measuring storing means for storing a representation of the carrier frequencies of those received radar pulses whose main lobes have a peak value greater than said upper value, the storing being for a period of time at least equal to the time period between two successive radar pulses from the same transmitter, and control means responding to said comparing means and said storing means for controlling the radar beacon to respond to only those radar pulses whose lobe peak values either exceed said upper value or said lower value provided a representation of the associated carrier frequency has not been stored.

3. The apparatus of claim 2 wherein said comparing means comprises a detector unit to peak detect the amptitude of the received radar pulses and a comparator circuit to compare said amptitude with said upper and lower threshold values.

4. The apparatus of claim 2 wherein said storing means comprises a frequency measuring means for measuring the carrier frequency of the received radar pulse and generating a first signal representative of the measured frequency.

5. The apparatus of claim 4 wherein said frequency measuring means further comprises means for generating a second signal having the measured carrier frequency.

6. The apparatus of claim 5 wherein said control means includes means for controlling the switching of said second signal to an antenna of the radar beacon for transmission.

* * * * *